Jan. 20, 1925.  1,523,701
G. H. MAXWELL
SHOE BOTTOM FILLER MACHINE
Filed April 19, 1923  2 Sheets-Sheet 2
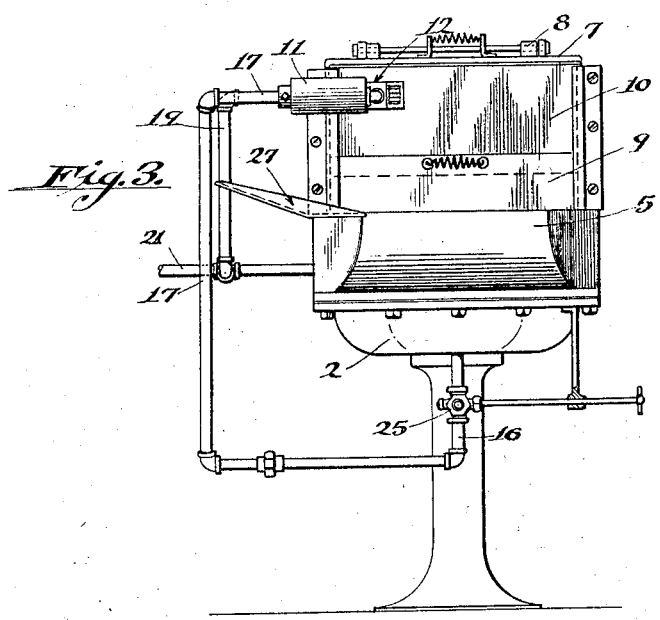
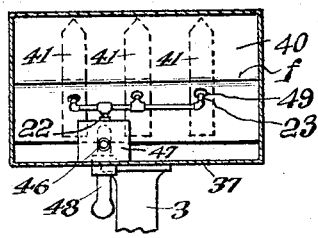
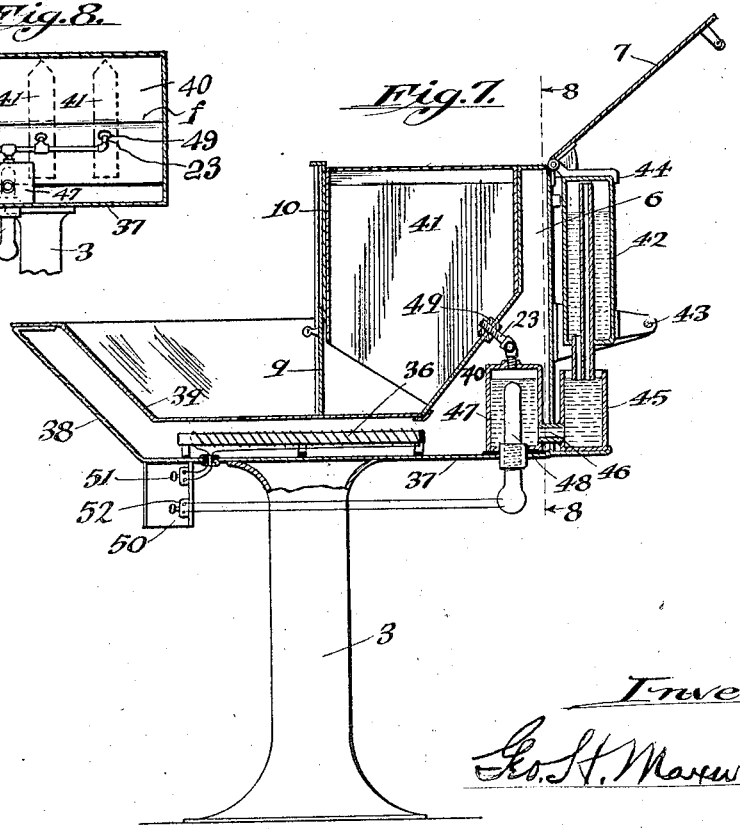
Inventor
Geo. H. Maxwell Patented Jan. 20, 1925.

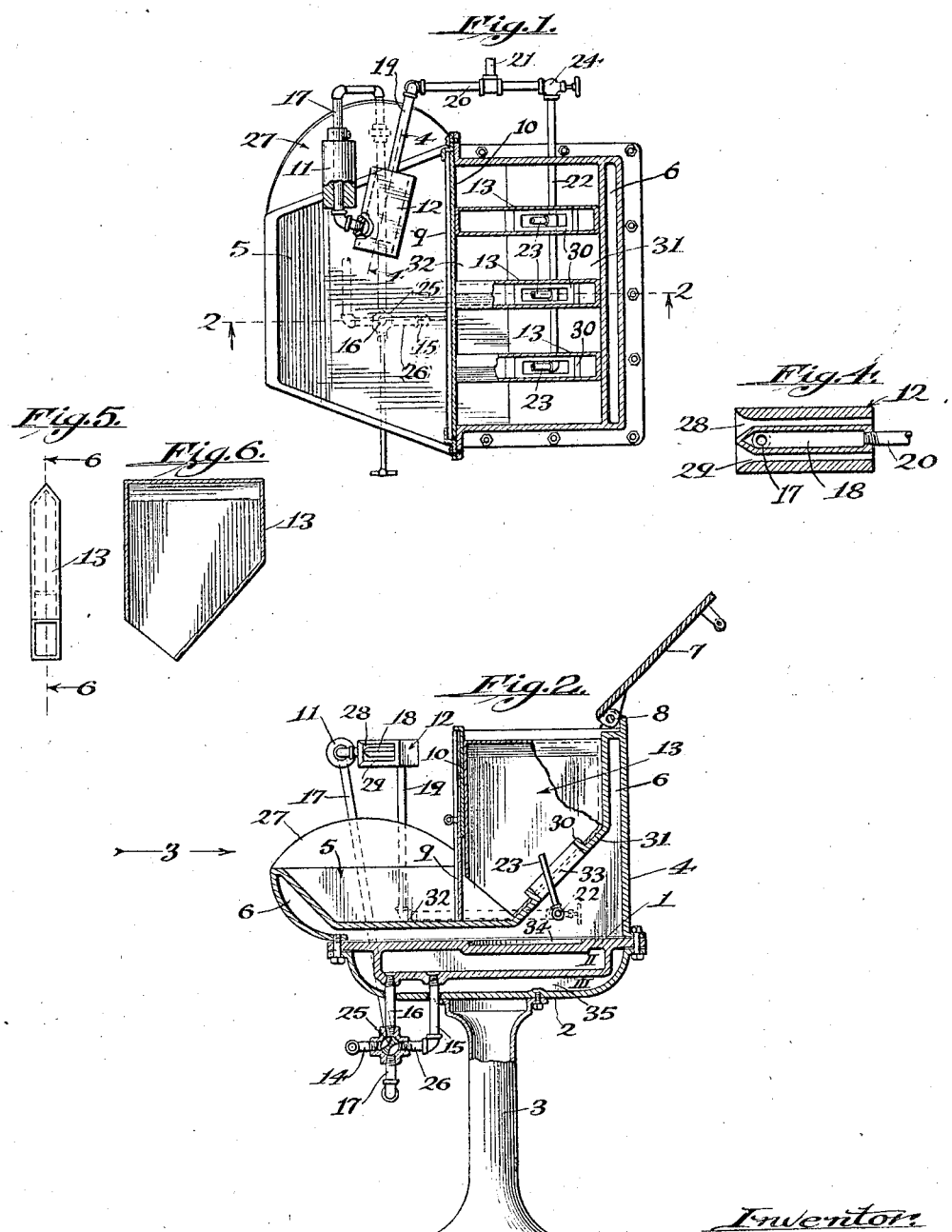

1,523,701

UNITED STATES PATENT OFFICE.

GEORGE H. MAXWELL, OF PHOENIX, ARIZONA.

SHOE-BOTTOM FILLER MACHINE.

Application filed April 19, 1923. Serial No. 633,148.

*To all whom it may concern:*

Be it known that I, GEORGE H. MAXWELL, a citizen of the United States, and a resident of Phoenix, county of Maricopa, and State of Arizona, have invented a new and useful Shoe-Bottom Filler Machine, of which the following is a specification.

My present invention is an improvement in the type of apparatus contained in my application Serial Number 560,800 filed May 13, 1922, now matured in Patent 1,512,229 granted Oct. 21, 1924, for use in filling shoe-bottoms with heated or heat-softened and plastic filler, my principal object being to render the former apparatus better adapted to the varying conditions of filler and factory and capable of meeting the varying speed requirements of different operators. To this end, I make the dry heat and the moist heat separately regulable, so that more or less moisture may be admitted to the filler in the reservoir without varying the heat of the work basin, and vice versa. As stated in my previous application above mentioned, my main object is to promote speed and efficiency without danger or injury to the filler, and accordingly I have provided means for always maintaining between the source of heat and the filler reservoir and work-basin a safety barrier, space, or chamber which precludes the possibility of a burning heat directly against the filler. In the apparatus of Patent 808,227 for instance, which has been and still is the form of apparatus in general use in shoe factories, the steam jacket is directly next to the filler, and as the steam pressure varies greatly in different shoe factories there has always been a great danger of burning the filler in those shoe factories using high steam pressure. To make this impossible in my present invention and yet at the same time promote speed of melting the filler, I mount the steam chest close to the filler reservoir and yet sufficiently removed from said reservoir to provide between the steam chest and reservoir a heat disseminating space sufficient to prevent a dangerous localizing of the heat at any one spot or small area which would otherwise be liable to burn the filler. In case a steam chest is not used, but other kinds of heat, as for instance an electric heating unit or units, the unit is kept out of direct contact with the bottom of the reservoir sufficiently to leave the same heat disseminating space and yet close enough to maintain speed of melting and delivery. And still further to adapt my invention to electricity, I maintain the heating chamber dry and free of moisture although preferably generating the steam, or at least introducing the steam connections, within it, and thence delivering the steam from said dry heating chamber into the heating flues and moisture laden reservoir above said dry chamber. High speed, coupled with safety, in melting and conditioning the filler and in removing and using the same, and economy of current or other source of heat are secured not merely by using high heat and steam but by balancing the two and using them in the right place at the right time and to the right extent. By concentrating the source of heat and the region of effort or application at and adjacent the bottom of the work-basin and the bottom of the mass of filler and by bringing the moisture treatment all over and through the lower end of the filler mass simultaneously with the dry heat attack on the basin and on the bottom of the reservoir it becomes possible to get the high speed sought and yet with safety. By thus driving steam into the entire bottom region at a sufficient number of points simultaneously with the quick high heating of the supporting metal, no charring or scorching can result because each and all the particles of the contacting and adjacent filler are moisture coated as soon or before the metal reaches its high heat. At the start the filler and metal being cold and the steam usually quite wet the filler may tend to get too wet before the metal gets properly hot. Hence the advantage of having separate control of the steam delivered and the dry heat. As the filler melts and is heated and as the metal gets hot and the steam gets hotter and drier, further relative adjustment may be desirable and sometimes necessary. From the concentration of the heat generation and application in the bottom of the apparatus and applying its maximum efficiency at the lower end of the filler mass three advantages result, viz, safety from burning as just explained, speed due to the safe employment of a high heat which was before impossible, and economy of energy (electric current or other source) due to the simultaneous employment of both kinds of heat and their employment simultaneously coextensively with and throughout the whole bottom of the mass and due to the progressive endwise melting and use of the filler so that it loosens most and is most easily penetrated by the steam at the region of use. At the point where the filler is used and hence tends to fall away and open or loosen down, I deliver simultaneously here and there jets or blasts of penetrating disintegrating steam, the machine holding the mass separated by its hot partitions into relatively small segregated portions so that it cannot mass or pack together but must remain instantly ready for fastest conditioning and surest maintenance thus, and therefore quick use. These small segregated portions are simultaneously attacked with steam and preferably with both steam and dry heat and both the metal and the adjacent filler are simultaneously treated at all points where the hot metal would otherwise burn the filler, with the great resultant advantage that both metal and filler are kept safely more highly heated and conditioned and by the same simultaneous applications and from the same source of heat (as dry heat to the underside of the metal bottom and as wet heat to the upperside of said bottom and the whole contacting area of filler) than was before possible.

In the accompanying drawings, I have shown my invention in two preferred embodiments, although it will be understood that I am not restricted thereto, as a wide range of embodiments is within the purview of this application.

In the drawings—

Fig. 1 is a top plan of the machine, partly in section and broken away;

Fig. 2 is a vertical section taken on the line 2—2, Fig. 1;

Fig. 3 is a view in front elevation;

Fig. 4 is a sectional detail on the line 4—4, Fig. 1;

Fig. 5 is a front elevation of the radiator or flue;

Fig. 6 is a vertical section of the radiator on the line 6—6, Fig. 5;

Fig. 7 is a central vertical section of the electric machine;

Fig. 8 is a vertical sectional detail on a reduced scale, taken on the line 8—8, Fig. 7.

Referring first to that form of the apparatus which is heated wholly by steam, shown in Figs. 1 to 4, I mount a steam chamber or heater plate 1 on a base or top flange 2 of a pedestal 3, and on said plate 1, a filler supply reservoir 4 and work-basin 5. The parts 4 and 5 are preferably made in one casting or piece and heat jacketed at 6. A cover 7 is hinged at 8 and a two-piece, slide door 9, 10 closes the front, while a usual filler laying or condensing roll 11 and a knife-block 12 are mounted at one side of and extending over the work-basin. Radiators in the form of heat-transmission flues or radiators 13 (using these terms as defined in the aforesaid application), shown in detail in Figs. 5 and 6, as having an open lower end with an opening for the admission of the heat or steam and a front bottom opening for the transmission of the steam out into the filler and otherwise closed or imperforate, are provided to extend up into and through the filler mass in the reservoir to introduce dry radiant heat into the upper part of the filler mass and moist heat into the bottom of the filler mass, thence to percolate upward through said mass. This main construction and arrangement of parts is in general the same as in my aforesaid application.

The heater plate 1 is spaced a short distance from the bottom of the work-basin 5 so as to provide a heat disseminating space or chamber to render the heat all around the basin uniform and prevent localizing undue heat at any one spot or region which would burn the filler. In speeding up the use of this heat-treated filler, there is danger of burning, or over-heating the filler, and one of the important aims of my invention is to minimize or conteract this danger. This provision for evening the heat permits a maximum heat without danger of drying out and charring or burning the filler because it maintains all the mass of filler uniformly hot and melted and moist.

A steam inlet pipe 14 connects with the steam chamber or chest 1 by pipes 15, 16 and thence by pipe 17 to the roll 11 which it also supports, being thence tapped into the block 12, the latter having a cored center 18, to constitute a heater for the knives. Thence a pipe 19 leads down and acts as a support for said knife block and connects with a pipe 20 and outlet 21. Another important feature of my invention is the separately controlled steam supply for reservoir 4, preferably through the radiators 13, shown as a supply pipe 22, having preferably a separate branch and discharge end or nozzle 23 for each radiator, and controlled by a hand-valve 24. A two-way valve 25 at the junction of the inlet pipe 14, pipe 16 and a connection 26 from pipe 15 controls the steam supply to the main heater or steam chest 1, when desired. An inwardly slanted shelf 27 supports the pipe standards 17 and 19 in position to direct all drippings of filler from the roll 11 or block 12 back into the work-basin. The knife block is placed back and slightly inward of the roll and has flaring upper and lower parallel mouths 28, 29 to receive two knives or spatulas (not shown) directly against the heater 18. A flange 30 of the inclined back portion 31 of the bottom 32 surrounds an opening 33 in the latter to prevent any accidental escape of filler below the bottom, and the opening 33 is shown as relatively large to admit a copious melting heat to the radiator even though the steam may be shut off from pipes 21. In the top side of the steam chest is a long shallow depression 34 to catch any condensation from the radiators 13 or pipe 22 and convert it instantly into steam again. The underside of the steam chest 1 and the base plate or flange 2 are so shaped as to provide a dead-air chamber 35 to insulate the steam chest, thereby conserving the heat and protecting the operator.

In Figs. 7 and 8, I have illustrated my improvements adapted to electric heat and control. The main heating unit or units 36 are mounted on the bottom 37 of an outer casing 38 which contains and supports all the rest of the machine. An inner portion preferably of sheet brass or other sheet metal extends forward to constitute a work-basin 39 and rearward and upward to constitute the hopper or reservoir 40. To this are secured the radiators or flues 41. The heater 36 is at such a distance below said inner portion as to distribute the heat therefrom through the air before reaching the parts 39 and 40 and hence to avoid localizing the heat in one spot which would burn the filler. This constitutes a heat disseminating space or chamber with the same function and advantage as already explained in connection with the first described form of my machine (and is a continuation, in this feature, of my aforesaid application). A water tank 42 is pivoted at 43 on brackets at the back of the reservoir and held upright by a hook 44 being constructed and operating as in my aforesaid application in well-known manner to drip into a water seal 45. The latter connects at 46 to an internal water basin or steam producer 47 containing an electric immersion-unit 48 below and within it screwed into its lower end from the outside of the apparatus. This location of the water basin 47 formed as an internal tank conserves the heat, utilizing to some extent also the heat from the main heater and permits easy clearing out through its bottom opening. At its upper end the water basin and steam producer 47 has a delivery pipe tapped into it with branches 23 (the same as the steam machine previously described) for providing steam in the reservoir, preferably extending into the radiators or flues 41 whence the steam, after heating the walls of the flues, escapes from the bottom of the latter out into the mass of the filler in the reservoir. As, however, the main function of these radiators is to radiate dry heat within the body of the filler in the reservoir, it will be understood that the desired dry heat may be obtained from the dry-heat space below, and the steam carried directly into the reservoir rather than through the radiators. In order to keep all moisture away from the heating units 36, the pipes 23 are secured with a tight joint 49 to the back of the reservoir 40 and each flue. The current-supply wires from the units 36 and 48 (and from the roll and knife-block, not shown) are led to a switch box 50 and to separate suitable switches at 51, 52 in well-known or convenient manner.

In use, the operator turns on the steam or electricity and fills the hopper with filler. As the melting or softening and disintegrating filler begins dropping down and slumping forward he observes whether it is too moist. This may be the case at the start, due to the steam condensing at the start against the colder walls and parts of the apparatus and against the cold filler, but is not so apt to be the case later when everything is at a working heat. If it is too moist, he cuts off the steam according to his judgment by the valve 24 or switch 52, but without slowing down the process as the dry heat remains radiating copiously from the steam chest 1 or the electric heater 36. If the dry heat seems too severe, he is able to cut this down, with or without a corresponding reduction of moisture in the filler. In other words, he is able at all times to temper the filler exactly as required by the peculiarities of the given batch of filler he is using and by the condition of the weather, and by the kind of shoes he is working on, or according to his speed as a workman. The heat disseminating space or chamber prevents burning or overheating the filler. The roll and knife block are so positioned, piped (or wired) with relation to the reservoir and the heating of the latter that a continuous high heat is maintained therein notwithstanding the lower heat at the bottom of the reservoir and basin and the variable steam heat within the reservoir. All parts can be kept independently as near the highest speed efficiency as is permitted by safety and the apparatus is simple, economical in use and does not require a high-grade intelligence to operate it. The trying conditions and peculiarities of this general method of filling shoe-bottoms are set forth at length in the Thoma Patent 1,225,372, patented May 8, 1917, which (together with the process patent there mentioned and dating back to 1907) marks the beginning of the use of steam in this art. The Thoma machine used vapor in a cloud and was necessarily slow. Baker's Patent 1,201,674 suggests employing steam but in connection with a severe downward pressing of the filler under force to eject it under compression.

Claims covering the electrical species and the features which include the dry-heat chamber and separate steam or moisture chamber, main heater combined with separate steam producer, and certain matters shown but not herein claimed are duly claimed in application Serial No. 656,496, filed August 9, 1923, and Patent 1,512,230 granted Oct. 21, 1924 copending herewith.

The present application covers broadly the provision of a heat disseminating space, the regulation or control of the steam delivery with relation to the dry heat delivery, the provision of intense dry heat on the bottom of the reservoir, the provision of nozzles or jet delivery of the steam, and the construction of flues having their lower ends cut off so as to be wholly open for the reception and delivery of steam, and is subordinate to the earlier or parent application Serial No. 560,800 which contains the broad or dominant claims relating to the flue feature and partition or compartment arrangement, the feature of driving the moist heat into the bottom of the filler mass so as to promote a loose, non-compacted falling tendency, the constructions for using high heat as distinguished from low heat, for using an automatic water supply and steam producing arrangement in the combination, for automatically varying the steam production and heat production, for utilizing a combination of dry heat and steam heat separately but in cooperative and inter-dependent relation.

I claim:

1. An apparatus of the kind described, comprising a reservoir adapted to hold and soften for use heat-sensitive shoe-bottom filler which prior to use is normally self-sustaining, permanently sticky but sluggishly fluid under moderate heat and liable to be charred and burned at high heat, constructed and arranged to deliver filler by gravity and falling disintegration as distinguished from forced downward pressure, heating means for said apparatus, and means adjustable independently of said heating means for introducing moisture simultaneously at different points into the filler in said reservoir to enable the regulation of the moisture to the requirements of the filler in accordance with the heat of said heating means and the speed of the operative, said adjustable moisture-providing means being cooperative with said heating means and said reservoir to maintain the lower portion of the contained filler looser and melting faster than the upper portion so as to promote a bottomward opening and falling disintegration tendency of the filler as it softens.

2. An apparatus of the kind described, comprising a reservoir to hold and soften for use shoe-bottom filler of the kind described, constructed and arranged to deliver filler by gravity and falling disintegration as distinguished from forced downward pressure, a work-basin opening therefrom in relation to receive the softened filler in loose, open condition, heating means for said apparatus, and means adjustable independently of said heating means for introducing moisture at different points into the filler in said reservoir to enable the regulation of the moisture to the requirements of the filler in accordance with the heat of said heating means and the speed of the operative.

3. An apparatus of the kind described, comprising a reservoir to hold and soften for use shoe-bottom filler of the kind described, constructed and arranged to deliver filler by gravity and falling disintegration as distinguished from forced downward pressure, a work-basin opening therefrom in relation to receive the softened filler in loose, open condition, heating means for said apparatus, and means adjustable independently of said heating means for supplying and introducing steam at different points into the filler in said reservoir to enable the regulation of the steam to the requirements of the filler in accordance with the heat of said heating means and the speed of the operative.

4. An apparatus of the kind described, comprising a reservoir to hold and soften for use shoe-bottom filler of the kind described, constructed and arranged to deliver filler by gravity and falling disintegration as distinguished from forced downward pressure and having a plurality of flues extending within the reservoir in position to separate the filler mass into relatively small segregated and subdivided portions; a work-basin opening therefrom in relation to receive the softened filler in loose, open condition, heating means for said apparatus, and means adjustable independently of said heating means for introducing moisture into each flue and thence into the filler in said reservoir.

5. An apparatus of the kind described, comprising a reservoir to hold and soften for use shoe-bottom filler of the kind described constructed and arranged to deliver filler by gravity and falling disintegration as distinguished from forced downward pressure, and having a partition in the form of a melting flue hollow for the width of the partition and closed except at its bottom end which is open to deliver steam into the two masses of filler held separated on either side of said partition, whereby said two masses of filler are being slowly melted by the radiant dry heat of the wide sides of the partition while the bottom portions thereof are being rapidly melted and therefore caused to fall or loosen downward by the percolating steam delivered from said open end, and means for introducing steam into said flue.

6. An apparatus of the kind described, comprising a reservoir to hold and soften for use shoe-bottom filler of the kind described, constructed and arranged to deliver filler by gravity and falling disintegration as distinguished from forced downward pressure, and having a plurality of hollow melting flues closed except at their lower ends which are open to deliver steam into the bottom part of the disintegrating mass of filler, said flues being positioned to hold the filler in separated relatively small, and, therefore, more readily penetrated and melted, portions, and means for introducing steam into said separating flues and thence out of the said open lower ends of the flues into the bottom areas of said separated portions of the filler, thereby to heat and loosen downward the bottom areas more rapidly than the radiant heat from the closed upper parts of said flues softens the upper areas of said separated portions of the filler.

7. In a machine of the kind described, the combination with a filler softening reservoir adapted to handle shoe-bottom filler which prior to use is normally self-sustaining but sluggishly fluid under moderate heat, of softening mechanism cooperative with said reservoir for rapidly softening and loosening and opening the contained filler, with safety, to a workable condition, said mechanism including means for the forced delivery of steam, as by jets, simultaneously in a plurality of points in the lower portion of the contained filler so as to cause the filler to open, loosen and melt faster in the lower portion than elsewhere, said mechanism being constructed and operating to proportion the heat and the moisture to maintain the lower part of the contained filler continuously moist and sluggishly plastic or workable and right for the shoe-bottom filling operation as distinguished from being either free flowing, washed or separated, or dry, or compacted.

8. In a machine of the kind described, the combination with a filler softening reservoir adapted to handle shoe-bottom filler which prior to use is normally self-sustaining but sluggishly fluid under moderate heat, of a heating unit or source of heat beneath said reservoir, and means for discharging steam through the bottom portion of the reservoir into the filler in the adjacent portion of the reservoir in the form of jets of steam delivering at a plurality of separated places.

9. An apparatus for the safe and rapid handling with high heat of a heat responsive sticky shoe-bottom filler which is liable to be charred and burned at high heat, comprising a filler supplying and delivering reservoir, having a plurality of vertical flues set so as to segregate and subdivide the filler mass into a plurality of relatively small portions of filler, and heating means below said reservoir including separate nozzles for discharging jets of steam into said respective flues to heat the latter and thence into the lower parts of the segregated portions of the filler separated by the flues, whereby the filler is melted slowly in its upper portion and more rapidly so as to fall away in its lower part, said lower part being kept moist by the steam adjacent the bottom of the reservoir.

10. An apparatus of the kind described, comprising a reservoir to hold and soften for use shoe-bottom filler of the kind described, constructed and arranged to deliver filler by gravity and falling disintegration as distinguished from forced downward pressure, a work basin opening therefrom in relation to receive the softened filler in loose, open condition, heating means for said apparatus, arranged to apply a higher melting and disintegrating heat adjacent the bottom part of the filler mass than its upper portion, and including steam delivering means having a plurality of nozzles extending into the bottom part of the reservoir for delivering separating and disintegrating jets of steam under pressure into the lower part of the filler mass to protect the same against burning and to promote a falling and opening tendency.

11. An apparatus of the kind described, comprising a reservoir to hold and soften for use shoe-bottom filler of the kind described, constructed and arranged to deliver filler by gravity and falling disintegration as distinguished from forced downward pressure, a work basin opening therefrom in relation to receive the softened filler in loose, open condition, heating means for said apparatus arranged to apply a higher melting and disintegrating heat adjacent the bottom part of the filler mass than its upper portion, and including radiant heating means and also steam delivering means, the latter having a plurality of nozzles extending into the bottom part of the reservoir for delivering separating and disintegrating jets of steam under pressure into the lower part of the filler mass to protect the same against burning and to promote a falling and opening tendency, and means for regulating said steam delivery independently of said radiant heating means to permit the regulation of the steam to the needs of the filler in accordance with the radiant heat and speed of the operative.

12. In a machine of the kind described, a filler supply reservoir having a plurality of flues extending within the same, a workbasin for receiving the melted filler from said reservoir, heating means below said reservoir and flues and said basin, a steam pipe extending into each flue for delivering steam into said flues and thence into the filler mass surrounding the flues, and means for controlling the steam in said pipe separately from said first mentioned heating means.

13. In a machine of the kind described for handling with high heat a heat-responsive sticky shoe-bottom filler which is liable to be charred and burned at high heat, a filler softening reservoir adapted to handle such filler, a heating chamber beneath said reservoir, heating means located within said chamber but at a distance below the reservoir sufficient to constitute a heat disseminating and evening space between the heating means and the bottom of the reservoir so as to prevent localizing a burning heat at any one spot liable to burn the filler supported on said bottom.

14. In a machine of the kind described, a filler supply reservoir and work-basin, a heater therefor spaced a short distance below the bottom of said basin and reservoir proportioned to provide a heat-disseminating space or chamber capable of rendering the heat against said bottom uniform and to prevent burning the filler, a heat radiator extending within said reservoir, and means for admitting heat into said radiator to enable the latter to heat the interior of the mass of filler in the reservoir.

15. In a machine of the kind described, a filler supply reservoir and work-basin, a heater therefor spaced a short distance below the bottom of said basin and reservoir proportioned to provide a heat-disseminating space or chamber capable of rendering the heat against said bottom uniform, and to prevent burning the filler, a heat flue extending within said reservoir, and means for admitting steam into said flue to enable the latter to heat the interior of the mass of filler in the reservoir.

16. In a machine of the kind described, a filler supply reservoir and work-basin with an outer enclosure forming an upright air space around the basin and reservoir, a heater mounted a short distance below the basin and reservoir proportioned and operating to provide a heat disseminating space or chamber connecting with said upright air space for enclosing the basin and reservoir with a safe uniform heat not liable to burn the filler, heat radiating means extending upward within the interior of the reservoir, and means for maintaining said radiating means hot for heating the interior of the mass of filler in the reservoir.

17. In a machine of the kind described, a filler supply reservoir and work-basin, a steam chest spaced below said reservoir and basin proportioned and operating to provide a heat disseminating space for properly heating said reservoir and work-basin with a safe uniform heat not liable to burn the filler, combined with means for conveying heat from said space into the mass of filler in the reservoir at a plurality of places throughout said mass.

18. In a machine of the kind described, a filler supply reservoir and work-basin, a steam chest spaced below said reservoir and basin proportioned and operating to provide a heat disseminating space for properly heating said reservoir and work-basin with a safe uniform heat not liable to burn the filler, combined with a plurality of heat radiators extending within said reservoir and opening into said air space for conveying heat throughout the mass of filler in the reservoir at a plurality of places therein.

19. In a machine of the kind described, a filler supply reservoir and work-basin, a steam chest spaced below said reservoir and basin proportioned and operating to provide an intervening hot air chamber capable of maintaining safe uniformity of heat distribution against said basin and reservoir, a heat radiator extending within said reservoir and opening into said air chamber, and a plate below and enclosing said steam chest spaced therefrom to provide a heat-insulating chamber therefor.

20. In a machine of the kind described, the combination with a filler softening reservoir adapted to handle heat-sensitive shoe-bottom filler which prior to use is normally self-sustaining but sluggishly fluid under moderate heat and is permanently sticky, and a high-heat heating unit or source of heat located below the bottom plate of said reservoir, said reservoir having a bottom plate normally maintained at a high heat by said unit which would burn the supported filler in normal condition, of conditioning means for maintaining said filler moist to the extent of safety against burning on said hot bottom plate but not to lose its heat sensitive quality and stickiness, all arranged to maintain the contained filler in a loose, open, non-compacted and readily permeable condition to receive easily and freely the heat and steam and to retain the same and for quick, easy delivery.

21. In a machine of the kind described for handling with high heat a heat responsive sticky shoe-bottom filler which is liable to be charred and burned at high heat, a filler softening reservoir, and high-heat heating means for applying to the bottom of said reservoir a heat that would burn the supported filler in normal condition, and means for simultaneously applying to the portion of said supported filler contiguous to said hot bottom a preservative amount of steam limited in extent to maintaining the filler safe against burning but not so as to lose its sticky condition, all arranged to maintain the contained filler in a loose, open, non-compacted and readily permeable condition to receive easily and freely the heat and steam and to retain the same and for quick, easy delivery.

22. In a machine of the kind described for handling with high heat a heat-responsive sticky shoe-bottom filler which is liable to be charred and burned at high heat, a filler softening reservoir, and high-heat heating means for applying to the bottom of said reservoir a heat that would burn the supported filler in normal condition, combined with regulable means to keep the filler layer or region adjacent said reservoir bottom always moist and safe against burning, all arranged to maintain the contained filler in a loose, open, non-compacted and readily permeable condition to receive easily and freely the heat and steam and to retain the same and for quick, easy delivery.

23. An apparatus for the safe and rapid handling with high heat of a heat responsive sticky shoe-bottom filler which is liable to be charred and burned at high heat, comprising a filler supplying and delivering reservoir, a work basin for receiving the softened filler from said reservoir, high heat means for applying to the bottom of the reservoir and basin a heat that would burn the filler in normal condition, and means to keep the layer of filler next to said bottom always moist during said high heat to prevent said burning and permit said rapid safe handling of the filler.

24. An apparatus for the safe and rapid handling with high heat of a heat responsive sticky shoe-bottom filler which is liable to be charred and burned at high heat, comprising a filler supplying and delivering reservoir, a work basin for receiving the softened filler from said reservoir, high heat means for applying to the bottom of the reservoir and basin a heat that would burn the filler in normal condition, and means to keep the layer of filler next to said bottom always moist during said high heat to prevent said burning and permit said rapid safe handling of the filler, including means to maintain the moisture limited with relation to the high heat to a mere preservative film without injury to the required sticky condition of the filler.

25. An apparatus for the safe and rapid handling with high heat of a heat responsive sticky shoe-bottom filler which is liable to be charred and burned at high heat, comprising a filler supplying and delivering reservoir, a work basin for receiving the softened filler from said reservoir, high heat means for applying to the bottom of the reservoir and basin a heat that would burn the filler in normal condition and steam delivering means to keep the layer of filler next to said bottom always moist during said high heat to prevent said burning and permit said rapid safe handling of the filler, including regulating means to keep said high heat and the steam delivery in controlled balance as required for safety and speed of handling the sensitive filler.

26. An apparatus for the safe and rapid handling with high heat of a heat responsive sticky shoe-bottom filler which is liable to be charred and burned at high heat, comprising a filler supplying and delivering reservoir, a work basin for receiving the softened filler from said reservoir, high heat means for applying to the bottom of the reservoir and basin a heat that would burn the filler in normal condition, and means to keep the layer of filler next to said bottom always moist during said high heat to prevent said burning and permit said rapid safe handling of the filler, including a centralized unit or region of concentrated heat for giving all the two heats aforesaid.

27. An apparatus for the safe and rapid handling with high heat of a heat responsive sticky shoe-bottom filler which is liable to be charred and burned at high heat, comprising a filler supplying and delivering reservoir and a work-basin extending forward from the bottom of the reservoir in position to receive by gravity the loosened melted filler from the reservoir, combined with high-heat means for applying an intense heat uniformly over the underside of the bottom of the reservoir and the basin, and means for applying steam to the top side of said bottom and the lower part of the filler mass supported above the bottom, including regulable means for applying said two heats simultaneously to the opposite respective sides of said bottom according to the requirements of safety and speed for the filler while preserving its stickiness.

28. In a machine of the kind described, a filler supply reservoir, a work-basin for receiving filler therefrom, heating means for melting the filler, a filler laying roll and a knife block mounted above said basin, said block being mounted with its longitudinal axis behind that of the roll and farther away from the front of the machine and nearer the rear and said block projecting further toward the middle of the basin than the roll.

29. In a machine of the kind described, a filler supply reservoir, a work-basin for receiving filler therefrom, heating means for melting the filler, a filler laying roll and a knife block mounted above said basin, said block having a central fixed heater and fixed knife receiving openings with flaring mouths positioned to receive the knives against the top and bottom sides respectively of said heater.

30. In a machine of the kind described, a filler supply reservoir, a work-basin for receiving filler therefrom, a filler laying roll mounted in front of said reservoir and above said basin, a heater for said reservoir and basin spaced a short distance below the bottom of said reservoir and basin proportioned and operating to provide a heat disseminating space or chamber capable of rendering the heat against said bottom uniform and to prevent burning the filler, and means for heating said roll so constructed and arranged as to maintain the roll continuously heated at a higher heat than the bottom of said reservoir and basin.

31. In a machine of the kind described, a filler supply reservoir, a work-basin for receiving filler therefrom, a filler laying roll mounted in front of said reservoir and above said basin, a heater for said reservoir and basin spaced a short distance below the bottom of said reservoir and basin proportioned and operating to provide a heat disseminating space or chamber capable of rendering the heat against said bottom uniform and to prevent burning the filler, and means for heating said roll so constructed and arranged as to maintain the roll continuously heated at a higher heat than the bottom of said reservoir and basin, a heat flue extending within said reservoir, and steam supplying means for admitting steam into said flue to enable the latter to condition and heat the interior of the mass of filler in the reservoir in addition to the aforesaid heat below the bottom of the reservoir and positioned to deliver steam adjacent said bottom and to maintain the layer of filler next to said bottom always moist when said bottom is hot to prevent burning of the filler, render said bottom slippery and speed the movement and safe handling of the filler.

GEORGE H. MAXWELL.